United States Patent
Moore et al.

(10) Patent No.: US 10,628,824 B2
(45) Date of Patent: Apr. 21, 2020

(54) SYSTEM AND METHOD FOR TRANSACTION-BASED TEMPORARY EMAIL

(71) Applicant: JPMorgan Chase Bank, N.A., New York, NY (US)

(72) Inventors: Devin C. Moore, Columbus, OH (US); Johanna L. Cohen, New York, NY (US); Derek Blevins, Worthington, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 572 days.

(21) Appl. No.: 14/882,071

(22) Filed: Oct. 13, 2015

(65) Prior Publication Data
US 2017/0103392 A1     Apr. 13, 2017

(51) Int. Cl.
| | |
|---|---|
| *G06Q 20/40* | (2012.01) |
| *G06Q 20/38* | (2012.01) |
| *G06Q 20/02* | (2012.01) |
| *G06Q 30/02* | (2012.01) |
| *H04L 29/06* | (2006.01) |

(52) U.S. Cl.
CPC ............. *G06Q 20/40* (2013.01); *G06Q 20/02* (2013.01); *G06Q 20/385* (2013.01); *G06Q 30/0222* (2013.01); *H04L 63/102* (2013.01); *H04L 2463/102* (2013.01)

(58) Field of Classification Search
CPC ........... G06Q 30/0615; G06Q 30/0613; G06Q 30/0609
See application file for complete search history.

(56) References Cited

U.S. PATENT DOCUMENTS

| | | |
|---|---|---|
| 8,452,658 B2 | 5/2013 | Urbanski |
| 9,756,000 B1 * | 9/2017 | Paulramachandran ...................... H04L 51/28 |

(Continued)

OTHER PUBLICATIONS

GentleSource—temporary e-mail (web page published on May 2, 2012 at www.gentlesource.com/temporary-email/) (Year: 2012).*

(Continued)

*Primary Examiner* — James M Detweiler
(74) *Attorney, Agent, or Firm* — Greenblum & Bernstein, P.L.C.

(57) ABSTRACT

According to one embodiment, a system comprises a customer database operable to store a customer account associated with a customer of an enterprise. The system also comprises a transaction module operable to receive, from a third party, a request to authorize a transaction. The transaction module is further operable to authorize the transaction and generate, in response to the authorized transaction, a transaction identifier to identify the transaction. The system further comprises a temporary email generator operable to generate a temporary email address for the transaction in response to the generated transaction identifier, link the temporary email address to a customer email address, and communicate the temporary email address to the third party. Additionally, the system comprises an integration module operable to receive transaction information from the third party and store the transaction information, wherein the transaction information is associated with the temporary email address.

15 Claims, 3 Drawing Sheets

(56) References Cited

U.S. PATENT DOCUMENTS

| | | | | |
|---|---|---|---|---|
| 2002/0174185 | A1* | 11/2002 | Rawat | G06Q 10/107 |
| | | | | 709/206 |
| 2006/0253578 | A1 | 11/2006 | Dixon et al. | |
| 2007/0299920 | A1* | 12/2007 | Crespo | G06Q 30/0603 |
| | | | | 709/206 |
| 2009/0171749 | A1 | 7/2009 | Laruelle et al. | |
| 2011/0093322 | A1* | 4/2011 | Lawe | G06Q 30/02 |
| | | | | 705/14.23 |
| 2011/0276590 | A1* | 11/2011 | Hayes | G06Q 10/107 |
| | | | | 707/769 |
| 2012/0239417 | A1* | 9/2012 | Pourfallah | G06Q 50/22 |
| | | | | 705/2 |
| 2013/0253986 | A1 | 9/2013 | Urbanski | |
| 2014/0006259 | A1* | 1/2014 | Grigg | G06Q 10/10 |
| | | | | 705/39 |
| 2014/0108134 | A1* | 4/2014 | Desmond | G06Q 30/02 |
| | | | | 705/14.49 |
| 2014/0372252 | A1* | 12/2014 | Raney | G06Q 30/0613 |
| | | | | 705/26.35 |
| 2015/0334108 | A1* | 11/2015 | Khalil | G06F 21/31 |
| | | | | 726/8 |

OTHER PUBLICATIONS

Yoyo Wallet, 4 pages, http://yoyowallet.com.
Hikari Matsuo, Yoyo: New U.K.-Based App Works Like A Modern Wallet, May 22, 2014, 4 pages, Information Space, Syracuse University School of Information Studies (http://infospace.ischool.syr.edu/2014/05/22/yoyo-new-u-k-based-app-works-like-a-modern-wallet).
PCT International Search Report dated Jan. 10, 2017.

\* cited by examiner

SYSTEM AND METHOD FOR TRANSACTION-BASED TEMPORARY EMAIL

TECHNICAL FIELD

This disclosure relates generally to transaction-based temporary email, and more particularly to generating a temporary email address for a transaction.

BACKGROUND

Traditionally, when a customer purchases a good or service from a vendor, the vendor provides the customer with a physical receipt as proof of the purchase. Vendors may also email electronic receipts to their customers in lieu of providing their customers with physical receipts. Sharing personal email addresses with vendors may present certain difficulties. For example, providing each vendor with a personal email address is time consuming. Further, providing personal email addresses to vendors presents privacy risks for customers.

In addition to receipts, vendors may provide promotions to a customer that the customer may use for future purchases. The vendor may mail the promotions to the customer or may provide the promotions through a vendor-specific application.

SUMMARY OF THE DISCLOSURE

According to embodiments of the present disclosure, disadvantages and problems associated with transaction-based email may be reduced or eliminated.

In accordance with a particular embodiment of the present disclosure, a system comprises a customer database, a transaction module, a temporary email generator, and an integration module. The customer database is operable to store a customer account associated with a customer of an enterprise, wherein the customer account comprises an email address of the customer. The transaction module is operable to receive, from a third party, a request to authorize a transaction, wherein the transaction is associated with the customer. The transaction module is further operable to authorize the transaction and generate, in response to the authorized transaction, a transaction identifier to identify the transaction. The temporary email generator is operable to generate a temporary email address for the transaction in response to the generated transaction identifier, wherein the temporary email address is based on the transaction identifier. The temporary email generator is further operable to link the temporary email address to the customer email address and communicate the temporary email address to the third party. The integration module is operable to receive transaction information from the third party and store the transaction information. The transaction information is associated with the temporary email address.

According to another embodiment of the present disclosure, a computer-readable medium comprising instructions is provided. The instructions are configured, when executed, to store a customer account associated with a customer of an enterprise, wherein the customer account comprises an email address of the customer. The instructions are configured to receive, from a third party, a request to authorize a transaction, wherein the transaction is associated with the customer, and authorize the transaction. The instructions are further configured to generate, in response to the authorized transaction, a transaction identifier to identify the transaction and generate a temporary email address for the transaction in response to the generated transaction identifier, wherein the temporary email address is based on the transaction identifier. Additionally, the instructions are configured to link the temporary email address to the customer email address, communicate the temporary email address to the third party, receive transaction information from the third party, and store the transaction information, wherein the transaction information is associated with the temporary email address.

According to a further embodiment of the present disclosure, a method comprises storing a customer account associated with a customer of an enterprise, wherein the customer account comprises an email address of the customer. The method further comprises receiving, from a third party, a request to authorize a transaction, wherein the transaction is associated with the customer, and authorizing the transaction. The method also comprises generating, in response to the authorized transaction, a transaction identifier to identify the transaction, and generating a temporary email address for the transaction in response to the generated transaction identifier, wherein the temporary email address is based on the transaction identifier. Additionally, the method comprises linking the temporary email address to the customer email address, communicating the temporary email address to the third party, receiving transaction information from the third party, and storing the transaction information, wherein the transaction information is associated with the temporary email address.

Certain embodiments of the present disclosure may provide one or more technical advantages. A technical advantage of one embodiment includes generating a temporary email address for a transaction associated with a customer and communicating the temporary email address to a third party (e.g., a vendor). This may eliminate the need for the customer to enter a personal email address when making a transaction, which saves the customer time. Also, by not entering a personal email address, the customer reduces privacy concerns. Another technical advantage may include receiving transaction information (e.g., a transaction receipt) from a third party and storing the transaction information, which may eliminate the need for customers to maintain paper receipts.

As another example, a technical advantage may include providing a single application that allows a user to access transaction information (e.g., a transaction receipt) associated with multiple vendors. Using this application, a user requests the transaction information using a user device, the requested transaction information is identified, and the requested transaction receipt is communicated to the application on the user device. This technique facilitates a quick and efficient retrieval of the transaction information from a plurality of vendors using the single application. Another technical advantage of an embodiment includes providing a central repository for rewards and coupons for multiple vendors, and allowing a customer to access the rewards and/or coupons through an application on a user device. A further technical advantage of an embodiment of the present disclosure includes determining a financial recommendation based on a purchase item and data from a customer account, which may assist customers in managing their customer accounts.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
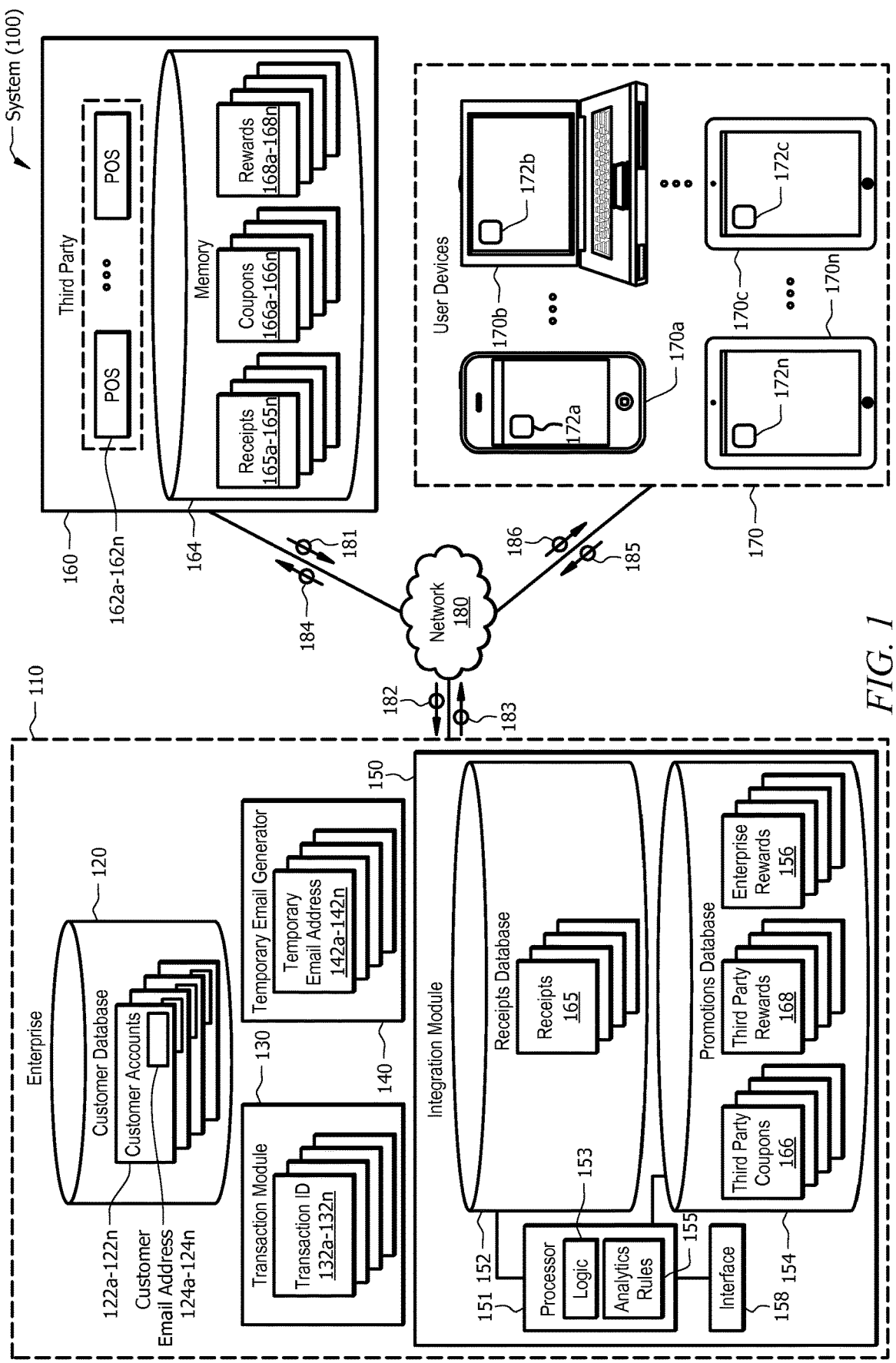
FIG. 1 illustrates an example embodiment of a system for transaction-based temporary email.
Figure 2:
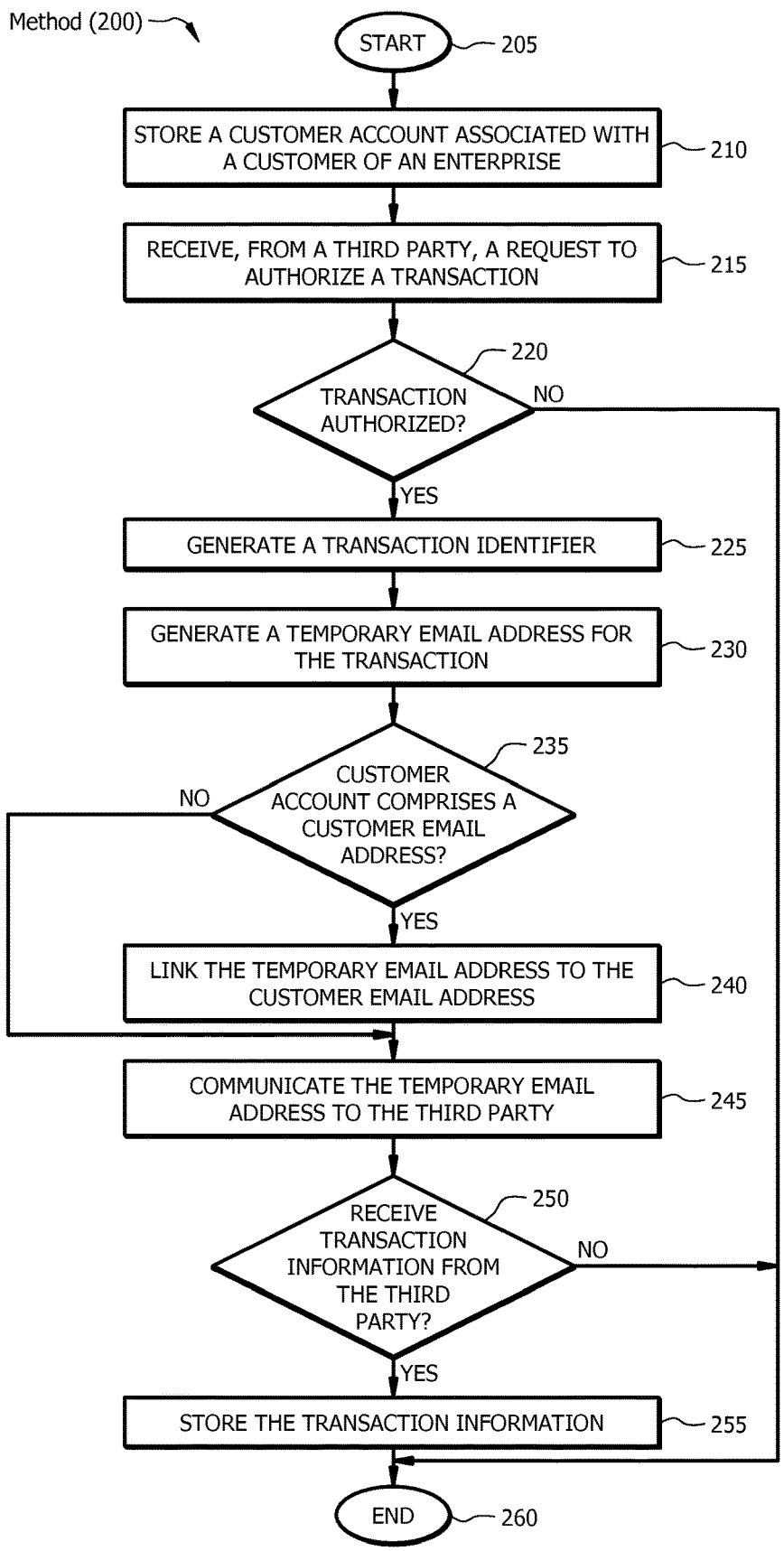
FIG. 2 illustrates a flowchart for transaction-based temporary email in accordance with embodiments of the present disclosure.
Figure 3:
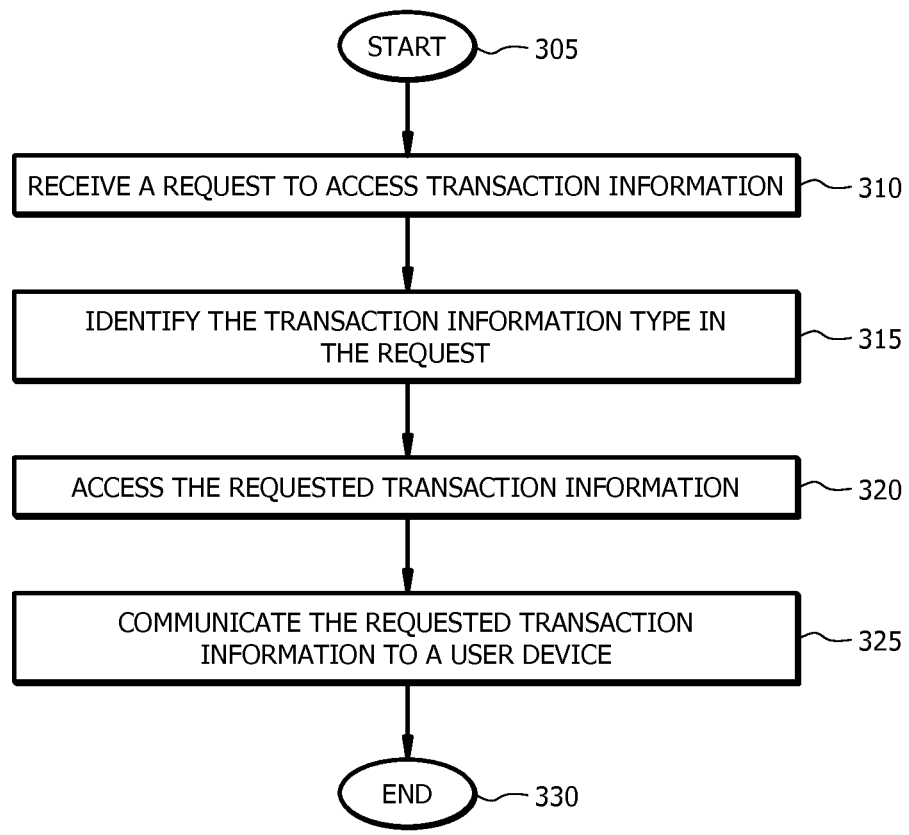
FIG. 3 illustrates a flowchart for transaction-based temporary email in accordance with other embodiments of the present disclosure.

Embodiments of the present invention and its advantages are best understood by referring to FIGS. 1, 2, and 3, like numerals being used for like and corresponding parts of the various drawings.

Traditionally, when a customer purchases a good or service from a vendor, the vendor provides the customer with a physical receipt as proof of the purchase. Vendors may also email electronic receipts to their customers in lieu of providing their customers with physical receipts. Sharing personal email addresses with vendors may present certain difficulties. For example, providing each vendor with a personal email address is time consuming. Further, providing personal email addresses to vendors presents privacy risks for customers. Accordingly, a need exists for providing customers with the transaction information while maintaining a customer's privacy.

In addition to receipts, vendors may provide promotions to a customer that the customer may use for future purchases. The vendor may mail the promotions to the customer or may provide the promotions through a vendor-specific application.

To facilitate generating transaction-based temporary email, enterprises may communicate with third parties and customers via networks. The teachings of this disclosure recognize that it would be desirable to provide a transaction module that receives requests from third parties (e.g., vendors) to authorize customer transactions, authorizes the customer transactions, and generates transaction identifiers in response to authorizing the transactions. The teachings of this disclosure also recognize that it would be desirable to provide a temporary email generator that generates temporary email addresses for the transactions, links the temporary email addresses to the customer email addresses, and communicates the temporary email addresses to the third parties. Further, the teachings of this disclosure recognize that it would be desirable to provide an integration module that receives transaction information (e.g., transaction receipts, coupons, rewards) from the third parties and stores the transaction information for future retrieval.

As such, the teachings of this disclosure provide several benefits for customers of an enterprise. For example, by generating a temporary email address for a customer transaction and communicating the temporary email address to a third party, the enterprise may eliminate the need for the customer to share a personal email address, which saves the customer time. Also, by not sharing the personal email address with third parties, the customer maintains the privacy of the personal email address.

FIG. 1 illustrates an example embodiment of a system for transaction-based temporary email. System 100 includes enterprise 110. Enterprise 110 may be an organization (e.g., a financial institution) that includes business units, divisions, or lines of businesses that handle the trade of various goods and services within the enterprise. Enterprise 110 of system 100 may have one or more customers, wherein the enterprise's customers may comprise individuals, entities, or a combination thereof. In the illustrated embodiment of FIG. 1, enterprise 110 comprises customer database 120, transaction module 130, temporary email generator 140, and integration module 150. Generally, customer database 120, transaction module 130, temporary email generator 140, and integration module 150 interact to efficiently analyze and communicate customer data. System 100 further comprises third party 160, user devices 170, and network 180.

In the illustrated embodiment of FIG. 1, customer database 120 stores customer accounts 122. Customer accounts 122a-122n represent the accounts a customer holds with enterprise 110, wherein n represents any suitable number. Customer account 122 may comprise one or more accounts held by a customer of enterprise 110. For example, customer account 122a may represent a personal checking account, savings account, credit card account, or investment account (e.g., money market deposit account). As another example, customer account 122b may represent an entity's commercial banking account (e.g., a small business checking account or a corporate account). Customer account 122 may include customer email addresses 124a-124n. For example, customer account 122a held by a particular customer of enterprise 110 may comprise that particular customer's email address. As another example, customer account 122a held by a particular customer of enterprise 110 may comprise multiple email addresses associated with that particular customer.

The illustrated embodiment of FIG. 1 further comprises transaction module 130. Transaction module 130 is operable to receive a request from third party 160 to authorize a transaction. The transaction represents any transfer or exchange of goods, services, and/or funds between enterprise 110 and third party 160. Third party 160 may be any entity external to the enterprise. For example, enterprise 110 may be a financial institution and third party 160 may be a vendor, distributor, reseller, or any other entity that provides a good or service to a customer.

Third party 160 may comprise points-of-sale 162a-162n, wherein n represents any suitable number. Point-of-sale 162 may comprise a device in a store of third party 160 or any other device that facilitates customer transactions. As shown in the illustrated embodiment, third party 160 further comprises memory 164 operable to store one or more transaction receipts 165a-165n and/or promotions. A transaction receipt (e.g., transaction receipt 165a) is any acknowledgment of the transaction. In the illustrated embodiment of FIG. 1, transaction receipt 165 represents an electronic acknowledgment. A promotion is something given to a customer to raise customer awareness of a product, brand or service, to create brand loyalty, and/or to generate sales. In the illustrated embodiment, promotions comprise coupons 166 and/or rewards 168. As shown in FIG. 1, transaction receipts 165a-165n, coupons 166a-166n, and rewards 168a-168n are associated with third party 160. A coupon (e.g., coupon 166a) may entitle a customer of third party 160 to a discount for a particular product or service, and a reward (e.g., reward 168a) may be given by third party 160 to a customer in recognition of the customer's behavior. For example, third party 160 may give a customer of third party 160 a reward for every dollar spent at third party 160's store. Coupons 166 and rewards 168 may be given to incentivize customers of third party 160 to continue a business relationship with third party 160 or to maintain their loyalty to third party 160.

Transaction module 130 of system 100 is further operable to authorize a transaction between a customer of enterprise 110 and third party 160. Customer of enterprise 110 may also be a customer of third party 160. In certain embodiments, transaction module 130 receives a request to authorize a transaction from third party 160 prior to authorizing the transaction. For example, a customer of enterprise 110 may attempt to purchase an item from third party 160 by swiping a debit card associated with customer account 122 at point-of-sale device 162. Third party 160 communicates with enterprise 110 requesting authorization of the purchase transaction. After verifying customer account 122 is adequately funded to cover the purchase transaction, enterprise 110 may authorize the transaction.

After authorizing the transaction, transaction module 130 of system 100 generates transaction identifier 132, as illustrated in FIG. 1. Transaction identifier 132 represents a string of characters that identifies the transaction. In some embodiments, transaction identifier 132 is a unique, temporary identifier that expires after a certain amount of time once the transaction is completed. For example, transaction identifier 132 may expire two hours once the transaction is completed and may be recycled and used again at a later time to identify a different authorized transaction. In certain embodiments, enterprise 110 associates transaction identifier 132 with the customer associated with the transaction. In the event that transaction identifier 132 expires, enterprise 110 may not associate transaction identifier 132 with the customer associated with the transaction. In some embodiments, transaction module 130 is further operable to process and complete the transaction and communicate the completed transaction to third party 160.

System 100, as shown in the illustrated embodiment of FIG. 1, further comprises temporary email generator 140. Temporary email generator 140 of system 100 generates temporary email addresses 142a-142n. For example, temporary email generator 140 of system 100 may generate temporary email address 142a for a transaction in response to generated transaction identifier 132a. Temporary email address 142 may be based on transaction identifier 132. For example, transaction module 130 may generate transaction identifier 132a that is represented as "123abc456," and temporary email generator may generate temporary email address 142a based on transaction identifier 132a, wherein temporary email address 142a is represented as 123abc456@domain.com.

Temporary email generator 140 of system 100 is further operable to link a temporary email address to an email address of a customer of enterprise 110. For example, temporary email generator 140 may link temporary email address 142a to customer email address 124a. In certain embodiments, temporary email generator 140 maps the temporary email address to an email address of a customer of enterprise 110. Mapping may comprise redirecting email sent to a temporary email address (e.g., temporary email address 142a) to the customer's email address (e.g., customer email address 124a). In some embodiments, temporary email generator 140 forwards emails received by a temporary email address to an email address of a customer of enterprise 110. In an embodiment, temporary email generator 140 automatically forwards emails received by temporary email address 142a to customer email address 124a.

In certain embodiments, temporary email generator 140 of system 100 communicates a temporary email address to third party 160. In some instances, temporary email generator 140 automatically communicates the temporary email address to third party 160. For example, temporary email generator 140 may automatically communicate temporary email address 142a to third party 160 in response to the generation of temporary email address 142a by temporary email generator 140. In some embodiments, temporary email generator 140 only communicates temporary email address 142a to third party 160 upon a request by third party 160 for a temporary email address.

Integration module 150 represents a component that facilitates the integration of transaction information from multiple third parties 160. In the illustrated embodiment, integration module 150 includes one or more processors 151, one or more interfaces 158, receipts database 152, and promotions database 154. As shown in the illustrated embodiment, processor 151 includes logic 153 and analytics/rules 155. Interface 158 of integration module 150 is operable to receive transaction information from third party 160. In certain embodiments, integration module 150 receives transaction information electronically.

Integration module 150, as illustrated in FIG. 1, may store transaction information in receipts database 152 and/or promotions database 154. Transaction information may comprise receipts 165a-165n received from third party 160, where n represents any suitable number. A transaction receipt is an acknowledgment of a transaction, such as a purchase transaction between third party 160 and a customer of enterprise 110. For example, integration module 150 may electronically receive transaction receipt 165a from third party 160 and store transaction receipt 165a in receipts database 152, wherein transaction receipt 165a comprises an acknowledgement of a purchase by a customer from third party 160. In certain instances, the customer of third party 160 is also a customer of enterprise 110.

In some embodiments, integration module 150 may receive a request to access transaction receipt 165a from user device 170. User devices 170 may include any suitable computing device that may be used to access one or more applications 172 through network 180. User devices 170 may include mobile computing devices with wireless network connection capabilities (e.g., wireless-fidelity (WI-FI), and/or BLUETOOTH capabilities). For example, user devices 170 may include smartphones, laptop computers, or tablet computers (such as smartphone 170a, laptop 170b, and tablet 170c). User devices 170 may also include non-mobile devices such as desktop computers. In certain embodiments, a number of different user devices 170 may be associated with a particular user. For example, a particular user may own each of smartphone 170a, laptop 170b, and tablet 170c, and may use such devices to access the one or more applications 172 as described herein.

Based on a request to access transaction receipt 165a from user device 170, integration module 150 may be operable to identify the requested transaction receipt 165a. For example, processor 151 of integration module 150 may analyze transaction receipts 165a-165n stored in receipts database 152 and identify transaction receipt 165a as the requested transaction receipt by distinguishing transaction receipt 165a from transaction receipts 165b-165n. In certain embodiments, integration module 150 is operable to communicate the requested transaction receipt (e.g., receipt 165a) to application 172 (e.g., application 172a on smartphone 170a, application 172b on laptop 170b, or application 172c on tablet 170c) on user device 170. For example, interface 158 of integration module 150 may receive a request from smartphone 170a to access a transaction receipt from a particular vendor. Processor 151 may identify the particular transaction receipt 165 from the receipts stored in receipts database 152, and interface 158 may communicate the requested transaction receipt 165 to application 172*a* on smartphone 170*a*. The user may then be able to quickly and efficiently access transaction receipt 165 from smartphone 170*a*.

As illustrated in the embodiment of FIG. 1, transaction information received by integration module 150 may comprise one or more promotions 154. A promotion 154 is something given to a customer to raise customer awareness of a product, brand or service, to create brand loyalty, and/or to generate sales. Integration module 150 may electronically receive a promotion from third party 160 and store the promotion in promotions database 154. Promotions 154 received by integration module 150 may comprise coupons 166*a*-166*n* and/or rewards 168*a*-168*n*.

In some embodiments, processor 151 of integration module 150 is operable to generate rewards 156*a*-156*n* for customers of enterprise 110. Generated rewards 156 may be stored in promotions database 154. In certain embodiments, generated rewards 156 are based on the received transaction information. Integration module 150 may be further operable to communicate generated rewards 156 to an application (e.g., application 172) on a user device (e.g., smartphone 170*a*). For example, integration module 150 may receive transaction receipt 165 indicating that a customer of enterprise 110 spent $100 at third party 160 and charged the transaction amount to a credit card associated with customer account 122. In this example, processor 151 may generate reward 156*a* comprising 100 points in honor of the customer, wherein award 156*a* represents a point for every dollar charged by the customer to the credit card associated with customer account 122. Integration module 150 may then communicate generated reward 156*a* (i.e., 100 points) to application 172 on user device 170, which allows the customer to manage and access the points at the customer's convenience.

In certain embodiments, integration module 150 receives a request to access a promotion from user device 170, wherein the promotion may be associated with third party 160. Based on the request to access the promotion, processor 151 may be operable to identify the requested promotion from promotions stored in database 154. In some embodiments, interface 158 is operable to communicate the requested promotion to application 172 (e.g., application 172*a* on smartphone 170*a*, application 172*b* on laptop 170*b*, and application 172*c* on tablet 170*c*) on user device 170. For example, integration module 150 may receive a request from tablet 170*c* to access a coupon from a vendor. Integration module 150 may then identify the vendor's coupon from coupons 166*a*-166*n* stored in promotions database 154 and communicate the requested vendor's coupon to application 172*c* on tablet 170*c*. The user may then be able to quickly and efficiently access the vendor's coupon from tablet 170*c*.

In some embodiments, transaction information received by integration module 150 may be associated with temporary email address 142. For example, third party 160 may email transaction receipt 165 to temporary email address 142. Integration module 150 may intercept a copy of transaction receipt 165 when transaction receipt 165 is sent to temporary email address 142. As another example, third party 160 may email coupon 166 to temporary email address 142, and integration module 150 may intercept a copy of coupon 166 when coupon 166 is sent to temporary email address 142. As yet another example, third party 160 may email reward 168 (e.g., points) to temporary email address 142, and integration module 150 may intercept a copy of reward 168 when reward 168 is sent to temporary email address 142.

Logic 153 of integration module 150 may include one or more computer programs operable to parse out information from emails sent to temporary email address 142. In certain embodiments, processor 151 may parse out data from an email sent to temporary email address 142 based on a template of an expected data structure. For example, processor 151 may identify transaction receipt 165 from an email sent to temporary email address 142 based on a template, and the identified transaction receipt 165 may be stored in receipts database 152. In some embodiments, processor 151 may parse out data per line item from an email sent to temporary email address 142. For example, processor 151 may parse out a line item for a health care expense from transaction receipt 165 and store that particular health care expense in a sub folder of receipts database 152 that includes health related expenses.

In certain embodiments, transaction module 130 is operable to complete the transaction in response to receiving the transaction information and communicate the completed transaction to third party 160. As an example, transaction module 130 receives a request from third party 160 to authorize a transaction for the purchase of an undetermined amount of gas for a customer of enterprise 110. Transaction module 130 authorizes the gas purchase transaction based on available funds in customer account 122, and temporary email generator 140 generates temporary email address 142 associated with the authorized transaction and communicates temporary email address 142 to third party 160. After third party 160 determines the cost for the gas received by the customer at third party 160, third party 160 may generate transaction receipt 165*a* and communicate transaction receipt 165*a* to enterprise 110. Enterprise 110 may then complete the transaction based on available funds in customer account 122 and communicate the transaction completion to third party 160. By requiring the receipt of transaction receipt 165*a* prior to completing the transaction, enterprise 110 may incentivize third party 160 to timely communicate transaction receipt 165 to enterprise 110.

According to some embodiments of the present disclosure, processor 151 of integration module 150 may be operable to determine, from the transaction information, an item purchased by a customer and determine a financial recommendation based on the purchased item and data from customer account 122. In certain embodiments, interface 158 of integration module 150 may be operable to communicate the financial recommendation to application 172 on user device 170. For example, processor 151 of integration module 150 may determine, from transaction receipt 165, that customer of enterprise 110 purchased a cup of coffee. Based on the purchased coffee, interface 158 of integration module 150 may communicate a financial recommendation to application 172*c* on tablet 170*c*, wherein the financial recommendation comprises transferring $2 from customer account 122*a* (i.e., customer savings account) to customer account 122*b* (i.e., customer checking account).

As another example, processor 151 of integration module 150 may determine, from transaction receipt 165, that customer of enterprise 110 invested in Stock A. Based on the purchased stock, interface 158 of integration module 150 may communicate a financial recommendation to application 172 that customer invest in Stock B. In certain embodiments, a customer account of enterprise 110 may comprise one or more rules that automatically generate a financial transaction based on information obtained by enterprise 110 from a transaction receipt. For example, a rule associated with customer account 122a may automatically transfer money from a customer's checking account to the customer's savings account when the transaction receipt shows a purchase of a certain class of items (e.g., clothing items).

In some embodiments, promotions database 154 is linked to customer account 122 such that a user of customer account 122 can search promotions database 154. For example, a user of customer account 122 may search receipts database 165 for expenses related to a certain category, such as health care expenses. The searchable database feature allows users to access records of certain expenses. In certain embodiments, a user may generate a financial transaction based on information obtained by enterprise 110 from the transaction information. For example, a customer may transfer funds to a savings account when transaction receipt 165 indicates a purchase of a certain class of items (e.g., household items). In some embodiments, enterprise 110 may offer incentives to a customer when the customer links customer account 122 to promotions database 154. Enterprise 110 may also provide information to the customer regarding other types of products or recommendations.

Network 180 may include any suitable one or more components for communicably coupling customer database 120, transaction module 130, temporary email generator 140, integration module 150, point-of-sale 162, memory 164, and user device 170. For example, network 180 may include an ad-hoc network, an intranet, an extranet, a virtual private network (VPN), a wired or wireless local area network (LAN), wide area network (WAN), metropolitan area network (MAN), a portion of the Internet, a portion of the Public Switched Telephone Network (PSTN), a portion of a cellular telephone network, or any other suitable communication link, including combinations thereof, operable to facilitate communication between the components of system 100. This disclosure contemplates end networks having one or more of the described properties of network 180.

System 100 includes one or more interfaces (e.g., interface 158). An interface represents any suitable device operable to receive information from network 180, transmit information through network 180, perform suitable processing of the information, communicate to other devices, or any combination of the preceding. For example, an interface of transaction module 130 may receive a request from third party 160 to authorize a transaction. As another example, interface 158 of integration module 150 may communicate temporary email address 142 to third party 160. Interfaces represent any port or connection, real or virtual, including any suitable hardware and/or software, including protocol conversion and data processing capabilities, to communicate through a LAN, WAN, or other communication system that allows enterprise 110 to exchange information between customer database 120, transaction module 130, temporary email generator 140, integration module 150, third party 160, user device 170, and other components of system 100.

In addition, system 100 includes one or more processors (e.g., processor 151). Processors control the operation and administration of enterprise 110 and/or the particular component by processing information received from interfaces. As such, processors are communicatively coupled to the interfaces. Processors include any hardware and/or software that operate to control and process information. For example, a processor of transaction module 130 generates a transaction identifier to identify a transaction. As another example, a processor of temporary email generator 140 generates temporary email address 142 for a transaction. In the illustrated embodiment, processor 151 facilitates the integration of the transaction information from various third parties 160. A processor may be programmable logic device, a microcontroller, a microprocessor, any suitable processing device, or any suitable combination of the preceding.

System 100 further includes one or more memories. For example, the illustrated embodiment of FIG. 1 includes memory 164 for third party 160, customer database 120, and receipts database 152 and promotions database 154 in integration module 150. A memory may represent a database that stores, either permanently or temporarily, information associated with a customer, information associated with third party 160, or any other suitable information. Memory includes any one or a combination of volatile or non-volatile local or remote devices suitable for storing information. For example, memory may include Random Access Memory ("RAM"), Read-only Memory ("ROM"), magnetic storage devices, optical storage devices, or any other suitable information storage device or a combination of these devices. Memory may include any suitable information for use in the operation of enterprise 110. Additionally, memory may be a component external to enterprise 110 and may be situated in any location suitable for memory to communicate to the other modules of system 100. Each component of system 100 (e.g., transaction module 130 and third party 160) can each contain more than one memory.

One or more rules may be included in the one or more memories and/or the one or more processors. Rules generally refer to logic (e.g., 153), rules (e.g., rules 155), algorithms, code, tables, and/or other suitable instructions embodied in a computer-readable storage medium for performing the described functions and operations of system 100. For example, rules may facilitate the generation of temporary email address 142 based on transaction identifier 132. In the illustrated embodiment of FIG. 1, logic 153 and rules 155 of integration module 150, upon execution by processor 151, facilitate identifying requested transaction information and determining whether to communicate the requested transaction information to an application on a user device. Logic 153 and rules 155 may also facilitate determining a financial recommendation based on a purchased item and data from a customer account (e.g., customer account 122). Similarly, other components of system 100 may comprise logic and rules. For example, transaction module 130 may comprise logic and rules that facilitate authorizing a transaction and determining a transaction identifier (e.g., transaction identifier 132).

Rules 155 may facilitate in tracking transaction information. In some embodiments, rules 155 may track transaction information by identifying and grouping transaction information based on similar products. For example, rules 155 may identify health care purchases from receipts database 152 and a memory of integration module 150 may store the health care purchases in a sub folder of receipts database 152, wherein the health care purchases are from different vendors. A user may then access the sub folder to track health care purchases across different locations. Additionally, enterprise 110 may use information acquired from cross-location tracking to drive promotions (e.g., business promotions) and/or to bank specific products such as savings incentives and credits. Information acquired from cross-tracking may include the types of items purchased by a customer, the time of year the items were purchased, the locations the items were purchased, or any other information that may be useful to enterprise 110 for driving promotions or banking specific products.

In an exemplary embodiment of operation, enterprise 110 stores customer account 122 associated with a customer in customer database 120. In the illustrated embodiment, customer account 122 includes email address 124 of the customer. Third party 160 sends message 181 to network 180 to authorize a transaction, and enterprise 110 receives message 182 from network 180 requesting authorization. Transaction module 130 of enterprise 110 authorizes the transaction and generates, in response to the authorized transaction, transaction identifier 132 to identify the transaction. Temporary email generator 140 of enterprise 110 generates temporary email address 142 for the transaction in response to generated transaction identifier 132. Temporary email address 142 may be based on transaction identifier 132. In an embodiment, temporary email generator 140 links temporary email address 142 to customer email address 124 and communicates temporary email address 124 (e.g., message 183) to network 180. Third party 160 receives temporary email address 124 (e.g., message 184) from network 180 and sends the transaction information (e.g., message 181) to network 180. Integration module 150 of enterprise 110 receives the transaction information (e.g., message 182) from network 180 and stores the transaction information, wherein the transaction information is associated with temporary email address 124.

In another exemplary embodiment of operation, user device 170 sends a request (e.g., message 185) to network 180 to access transaction information (e.g., receipt 165, coupon 166, and/or reward 168). Integration module 150 of enterprise 110 receives the request to access transaction information from network 180, identifies the requested transaction information, and communicates the requested transaction information. User device 170 receives the requested transaction information (e.g., message 186) from network 180.

System 100 may include one or more computers. A computer may be any device that interacts with system 100. A computer may use a processor and a memory to execute an application in order to perform any of the functions described herein. A computer may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. A computer may also include a user interface, such as a display, a touchscreen, a microphone, keypad, or other appropriate terminal equipment usable by a user.

A component of system 100 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 100 of FIG. 1 without departing from the scope of the invention. For example, system 100 may include any number of customer databases 120, integration modules 150, third parties 160, and user devices 170. Similarly, customer database 120, as an example, may include a plurality of databases in some embodiments. In some instances, memory 164 may be external to third party 160. Furthermore, the components of system 100 may be integrated or separated. For example, transaction module 130 and integration module 150 may be incorporated into a single component. Additionally, a component of system 100 may be operable to perform a task of a different component of system 100. For instance, integration module 150 may be operable to link temporary email address 142 to customer email address 124.

FIG. 2 illustrates an example method 200 for transaction-based temporary email in accordance with embodiments of the present disclosure. The method starts at step 205. At step 210, a customer account (e.g., customer account 122) associated with a customer of an enterprise (e.g., enterprise 110) is stored in one or more memories. For example, the customer account may be stored in a customer database (e.g., customer database 120). In some instances, the customer account may be stored in a memory external to the enterprise. In some embodiments, the customer account comprises an email address of the customer.

At step 215, a request to authorize a transaction is received from a third party (e.g., third party 160). The transaction may be associated with a customer of the third party. The third party's customer may also be a customer of an enterprise (e.g., enterprise 110). At step 220, a processor determines whether the transaction is authorized. For example, a customer of an enterprise may have a customer account (e.g., customer account 122*a*) with the enterprise. The enterprise may receive a request to authorize a purchase transaction from a third party. In this example, the purchase transaction is between the customer of the enterprise and the third party. The enterprise may then authorize the purchase transaction based on adequate funds in the customer account. Alternatively, if the customer account shows inadequate funds, the enterprise may deny authorization of the purchase transaction and method 200 moves to step 260, where the method ends.

If it is determined that the transaction is authorized, method 200 proceeds to step 225. At step 225, a transaction identifier (e.g., transaction identifier 132*a*) is generated. The transaction identifier identifies the transaction and may be temporarily associated with a customer account. In some embodiments, the transaction identifier is a unique, temporary identifier that expires after a certain amount of time after the transaction is completed. The transaction identifier may be recycled and reused for a future transaction. In some embodiments, the transaction identifier is not recycled and may be permanently associated with a customer account.

At step 230, a temporary email address (e.g., temporary email address 142*a*) is generated for the transaction. The temporary email address may be based on the generated transaction identifier. For example, a processor may generate a temporary email address by incorporating the transaction identifier into the local part of the temporary email address. In some instances, the local part of the temporary email address may consist entirely of the transaction identifier. For example, if the generated transaction identifier is 123abc456, the generated temporary email address may be 123abc456@domain.com. In some embodiments, temporary email address may not be based on the transaction identifier.

At step 235, a determination is made as to whether the customer account comprises an email address of the customer. If it is determined that the customer account comprises a customer email address, method 200 moves to step 240, where the temporary email address is linked to a customer email address. As an example, an enterprise links the temporary email address to the customer email address by mapping the temporary email address to the customer email address. As another example, the enterprise may link the temporary email address to the customer email address by automatically forwarding emails received by the temporary email address to the customer email address. If it is determined that the customer account does not comprise a customer email address, the method skips step 240 and advances to step 245.

At step 245, the temporary email address is communicated to the third party. For example, an enterprise may communicate the temporary email address to the third party over a network (e.g., network 180). At step 250, a processor determines whether transaction information (e.g., transaction receipt 165, coupon 166, and/or reward 168) is received from the third party. For example, the third party may communicate a transaction receipt to the enterprise using the temporary email address communicated to the third party, and the enterprise may receive the transaction receipt through an email associated with the temporary email address. If it is determined that transaction information is received from the third party, the transaction information is stored at step 255. For example, the enterprise may store a received transaction receipt in a receipt database (e.g., receipt database 152). After storing the transaction information, the method ends at step 260. If it is determined that transaction information is not received from the third party, method 200 skips step 255 and advances to step 260, where the method ends.

FIG. 3 illustrates an example method 300 for transaction-based temporary email in accordance with embodiments of the present disclosure. The method starts at step 305. At step 310, a request to access transaction information is received. For example, an interface may receive a request to access transaction information (e.g., receipts 165, coupons 166, and/or rewards 168) from a user device (e.g., user device 170). Method 300 next moves to step 315, where the transaction information type in the request is identified. For instance, a processor may determine that the requested transaction information type is a receipt 165. At step 320, the requested transaction information is accessed. In some embodiments, a processor accesses the transaction information. Method 300 then moves to step 325, where the requested transaction information is communicated to a user device. For example, an enterprise may receive a request from a smartphone (e.g., smartphone 170a) of a customer of the enterprise to access a coupon. The enterprise identifies the coupon from the coupons in the enterprise's promotion database and communicates the coupon to the customer's smartphone, which allows the customer to quickly and efficiently access the coupon. After communicating the transaction information to the user device, method 300 ends at step 330.

Modifications, additions, or omissions may be made to methods 200 and 300 without departing from the scope of the present disclosure. For example, the order of the steps may be performed in a different manner than that described and some steps may be performed at the same time. Additionally, each individual step may include additional steps without departing from the scope of the present disclosure.

Certain embodiments of the present disclosure may provide one or more technical advantages. A technical advantage of one embodiment includes generating a temporary email address for a transaction associated with a customer and communicating the temporary email address to a third party (e.g., a vendor). This may eliminate the need for the customer to enter a personal email address when making a transaction, which saves the customer time. Also, by not entering a personal email address, the customer reduces privacy concerns. Another technical advantage may include receiving transaction information (e.g., a transaction receipt) from a third party and storing the transaction information, which may eliminate the need for customers to maintain paper receipts.

As another example, a technical advantage may include providing a single application that allows a user to access transaction information (e.g., a transaction receipt) associated with multiple vendors. Using this application, a user requests the transaction information using a user device, the requested transaction information is identified, and the requested transaction receipt is communicated to the application on the user device. This technique facilitates a quick and efficient retrieval of the transaction information from a plurality of vendors using the single application. Another technical advantage of an embodiment includes providing a central repository for rewards and coupons for multiple vendors, and allowing a customer to access the rewards and/or coupons through an application on a user device. A further technical advantage of an embodiment of the present disclosure includes determining a financial recommendation based on a purchase item and data from a customer account, which may assist customers in managing their customer accounts.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. An enterprise computing device, comprising
memory comprising programmed instructions stored thereon, and
one or more processors coupled to the memory, and configured to execute the stored programmed instructions to conduct operations, the operations including
authorizing a transaction received from a third party device via one or more communication networks, wherein the transaction is associated with a customer account stored in a customer database;
generating, in response to the authorized transaction, a transaction identifier associated with the transaction and a temporary email address;
mapping the temporary email address to a customer email address in the customer database, the customer email address stored in the customer database as associated with the customer account;
communicating the temporary email address to the third party device via the one or more communication networks;
receiving, via the temporary email address, transaction data corresponding to the transaction from the third party device and via the one or more communication networks, the transaction data including a transaction receipt;
determining that the transaction receipt shows a purchase of a certain class of items;
initiating an automatic transfer of money between different customer accounts based at least in part on the determination that the transaction receipt shows a purchase of a certain class of items;
automatically forwarding, via another one or more communication networks, the transaction data to the customer email address based on the mapping of the temporary email address to the customer email address stored in the customer database;
monitoring a certain amount of time that the transaction identifier is valid after the transaction is completed, the passing of the certain amount of time resulting in the transaction identifier becoming expired;
determining that the certain amount of time has passed;
recycling the transaction identifier based at least in part on the determination that the certain amount of time has passed; and
using the recycled transaction identifier at a later time to identify a different authorized transaction.

2. The system enterprise computing device of claim 1, wherein the one or more processors are further configured to execute the stored programmed instructions to conduct operations, including storing the transaction data in the customer database as associated with the customer account.

3. The enterprise computing device of claim 2, wherein the transaction data includes a promotion associated with a third party related with the third party device, the third party promotion comprises a coupon or a reward, and the one or more processors are further configured to execute the stored programmed instructions to conduct operations, including:
receiving a request to access, from the user device and via the another one or more communication networks, the promotion;
identifying the promotion responsive to the request with the stored customer account; and
communicating the promotion to an application on the user device via the another one or more communication networks.

4. The system enterprise computing device of claim 1, wherein the one or more processors are further configured to execute the stored programmed instructions to conduct operations, including:
determining, from the transaction data, an item purchased by a customer associated with the customer account;
determining a financial recommendation based on the item and data from the customer account; and
communicating the financial recommendation to an application on the user device via the another one or more communication networks.

5. The enterprise computing device of claim 1, wherein the one or more processors are further configured to execute the stored programmed instructions to conduct operations, including:
completing the transaction; and
communicating an indication of the completion of the transaction to the third party device via the one of more communication networks.

6. A non-transitory computer-readable medium including instructions stored thereon for transaction processing and automated transaction data reporting between third party and user devices, the instructions comprising executable code that, when executed by a processor, causes the processor to conduct operations, including:
authorizing a transaction received from a third party device via one or more communication networks, wherein the transaction is associated with a customer account stored in a customer database;
generating, in response to the authorized transaction, a transaction identifier associated with the transaction and a temporary email address;
mapping the temporary email address to a customer email address in the customer database, the customer email address stored in the customer database as associated with the customer account;
communicating the temporary email address to the third party device via the one or more communication networks;
receiving, via the temporary email address, transaction data corresponding to the transaction from the third party device and via the one or more communication networks, the transaction data including a transaction receipt;
determining that the transaction receipt shows a purchase of a certain class of items;
initiating an automatic transfer of money between different customer accounts based at least in part on the determination that the transaction receipt shows a purchase of a certain class of items;
automatically forwarding, via another one or more communication networks, the transaction data to the customer email address based on the mapping of the temporary email address to the customer email address stored in the customer database;
monitoring a certain amount of time that the transaction identifier is valid after the transaction is completed, the passing of the certain amount of time resulting in the transaction identifier becoming expired;
determining that the certain amount of time has passed;
recycling the transaction identifier based at least in part on the determination that the certain amount of time has passed; and
using the recycled transaction identifier at a later time to identify a different authorized transaction.

7. The computer-readable medium of claim 6, wherein the executable code, when executed by the processor, further causes the processor to conduct operations, including storing the transaction data in the customer database as associated with the customer account.

8. The computer-readable medium of claim 6, wherein the transaction data includes a promotion associated with a third party associated with the third party device, the third party promotion comprises a coupon or a reward, and the executable code, when executed by the processor, further causes the processor to conduct operations, including:
receiving a request to access, from the user device and via the another one or more communication networks, the promotion;
identifying the promotion responsive to the request with the stored customer account; and
communicating the promotion to an application on the user device via the another one or more communication networks.

9. The computer-readable medium of claim 6, wherein the executable code, when executed by the processor, further causes the processor to conduct operations, including:
determining, from the transaction data, an item purchased by a customer associated with the customer account;
determining a financial recommendation based on the item and data from the customer account; and
communicating the financial recommendation to an application on the user device via the another one or more communication networks.

10. The computer-readable medium of claim 6, wherein the executable code, when executed by the processor, further causes the processor to conduct operations, including:
  completing the transaction; and
  communicating an indication of the completion of the transaction to the third party device via the one or more communication networks.

11. A method for transaction processing and automated transaction data reporting between third party and user devices, the method implemented by one or more enterprise computing devices, the method comprising:
  authorizing a transaction received from a third party device via one or more communication networks, wherein the transaction is associated with a customer account stored in a customer database;
  generating, in response to the authorized transaction, a transaction identifier associated with the transaction and a temporary email address;
  mapping the temporary email address to a customer email address in the customer database, the customer email address stored in the customer database as associated with the customer account;
  communicating the temporary email address to the third party device via the one or more communication networks;
  receiving, via the temporary email address, transaction data corresponding to the transaction from the third party device and via the one or more communication networks, the transaction data including a transaction receipt;
  determining that the transaction receipt shows a purchase of a certain class of items;
  initiating an automatic transfer of money between different customer accounts based at least in part on the determination that the transaction receipt shows a purchase of a certain class of items;
  automatically forwarding, via another one or more communication networks, the transaction data to the customer email address based on the mapping of the temporary email address to the customer email address stored in the customer database;
  monitoring a certain amount of time that the transaction identifier is valid after the transaction is completed, the passing of the certain amount of time resulting in the transaction identifier becoming expired;
  determining that the certain amount of time has passed;
  recycling the transaction identifier based at least in part on the determination that the certain amount of time has passed; and
  using the recycled transaction identifier at a later time to identify a different authorized transaction.

12. The method of claim 11, further comprising:
  storing the transaction data in the customer database as associated with the customer account.

13. The method of claim 11,
wherein the transaction data includes a promotion associated with a third party associated with the third party device, the third party promotion includes a coupon or a reward, and the method further comprises:
  receiving a request to access, from the user device and via the another one or more communication networks, the promotion;
  identifying the promotion responsive to the request with the stored customer account; and
  communicating the promotion to an application on the user device via the another one or more communication networks.

14. The method of claim 11, further comprising:
  determining, from the transaction data, an item purchased by a customer associated with the customer account;
  determining a financial recommendation based on the item and data from the customer account; and
  communicating the financial recommendation to an application on the user device of the customer via the another one or more communication networks.

15. The method of claim 11, further comprising:
  completing the transaction; and
  communicating an indication of the completion of the transaction to the third party device via the one or more communication networks.

* * * * *